(12) United States Patent
Meloche

(10) Patent No.: US 9,591,108 B2
(45) Date of Patent: Mar. 7, 2017

(54) MANAGEMENT OF NETWORK IMPAIRMENT BY COMMUNICATION ENDPOINTS

(71) Applicant: Avaya Inc., Basking Ridge, NJ (US)

(72) Inventor: Jean Meloche, Madison, NJ (US)

(73) Assignee: Avaya Inc., Santa Clara, CA (US)

( * ) Notice: Subject to any disclaimer, the term of this patent is extended or adjusted under 35 U.S.C. 154(b) by 321 days.

(21) Appl. No.: 13/971,457

(22) Filed: Aug. 20, 2013

(65) Prior Publication Data

US 2015/0058492 A1 Feb. 26, 2015

(51) Int. Cl.
*G06F 15/16* (2006.01)
*H04L 29/14* (2006.01)
*H04L 29/06* (2006.01)

(52) U.S. Cl.
CPC ............ *H04L 69/40* (2013.01); *H04L 69/165* (2013.01)

(58) Field of Classification Search
CPC . H04L 67/141; H04L 65/1069; H04L 69/165; H04L 69/40; H04L 65/80
See application file for complete search history.

(56) References Cited

U.S. PATENT DOCUMENTS

| | | | | | |
|---|---|---|---|---|---|
| 5,887,136 | A * | 3/1999 | Yasuda | .................... | H04L 29/06 348/E7.084 |
| 6,738,357 | B1 * | 5/2004 | Richter | .................... | H04L 12/18 348/E7.081 |
| 7,617,337 | B1 * | 11/2009 | Beck | ....................... | H04L 65/80 370/229 |
| 7,843,842 | B2 * | 11/2010 | Ethier | .................. | H04L 12/2602 370/248 |
| 7,965,706 | B2 * | 6/2011 | Iwakawa | ............... | H04L 69/329 370/360 |
| 9,019,336 | B2 * | 4/2015 | Lindblom | ............. | H04L 65/403 348/14.01 |
| 9,088,651 | B2 * | 7/2015 | Ramalingam | ........... | H04M 3/46 |
| 9,246,973 | B2 * | 1/2016 | Hadinata | ............. | H04L 65/1083 |
| 9,307,094 | B2 * | 4/2016 | Nowack | ............ | H04M 15/8044 |
| 2007/0076605 | A1 * | 4/2007 | Cidon | ................. | H04L 12/2697 370/230 |
| 2007/0273749 | A1 * | 11/2007 | Fujii | ................. | H04M 1/72522 348/14.01 |

(Continued)

*Primary Examiner* — Ario Etienne
*Assistant Examiner* — Kidest Mendaye
(74) *Attorney, Agent, or Firm* — Sheridan Ross P.C.

(57) ABSTRACT

A communication session is established between a first communication endpoint and a second communication endpoint. A determination of a network condition is made, such as determining a type of network impairment. In response to determining the network condition, a message is sent to the second communication endpoint that requests the second communication endpoint to change a process for sending packets in the communication session. The process for changing packets can include: having the second communication endpoint send the same packets in the communication session at least twice; having the second communication endpoint use a different packet priority value for the communication session; having the second communication endpoint switch from a connection oriented protocol to a connectionless protocol for the communication session; and having the second communication endpoint switch from the connectionless protocol to the connection oriented protocol for the communication session.

19 Claims, 4 Drawing Sheets

(56) References Cited

U.S. PATENT DOCUMENTS

| | | | |
|---|---|---|---|
| 2008/0205267 A1* | 8/2008 | El Barachi | H04L 65/80 370/230 |
| 2009/0041013 A1* | 2/2009 | Mitchell | H04L 12/14 370/392 |
| 2009/0279545 A1* | 11/2009 | Moonen | H04L 29/06027 370/389 |
| 2009/0323524 A1* | 12/2009 | Kuhn | H04L 43/0894 370/230 |
| 2010/0004007 A1* | 1/2010 | Vogel | H04L 12/5895 455/466 |
| 2010/0040077 A1* | 2/2010 | Maze | H04L 47/2458 370/412 |
| 2010/0226252 A1* | 9/2010 | Gogic | H04L 47/10 370/236 |
| 2013/0163423 A1* | 6/2013 | Cayeux | H04L 47/10 370/231 |
| 2013/0235731 A1* | 9/2013 | Hadinata | H04L 65/1083 370/241 |
| 2014/0041002 A1* | 2/2014 | Liu | H04L 63/083 726/7 |
| 2014/0041022 A1* | 2/2014 | Small et al. | 726/22 |
| 2014/0071814 A1* | 3/2014 | Landscheidt | H04L 41/0816 370/229 |

\* cited by examiner

MANAGEMENT OF NETWORK IMPAIRMENT BY COMMUNICATION ENDPOINTS

TECHNICAL FIELD

The systems and methods relate to communication systems and in particular to managing network impairment.

BACKGROUND

In communication networks, packet loss and jitter are the primary source of poor performance in real-time communications, such as voice and video communications. This problem is further exacerbated when the number of packets for these real-time communications exceeds a Service Level Agreement (SLA) threshold. In these cases, packets that are in excess of the SLA are dropped by the service provider. This makes real-time communications even more vulnerable to packet loss.

In these situations, other types of bandwidth defined by the SLA may not be fully utilized. For example, during peak network traffic periods, audio traffic may be exceeding the SLA while video traffic and data traffic are not exceeding the SLA. What is needed is a solution to effectively identify where packet loss and jitter are affecting signal quality by utilizing different solutions to account for packet loss.

SUMMARY

Systems and methods are provided to solve these and other problems and disadvantages of the prior art. A communication session is established between a first communication endpoint and a second communication endpoint. A determination of a network condition is made, such as determining a type of network impairment. In response to determining the network condition, a message is sent to the second communication endpoint that requests the second communication endpoint to change a process for sending packets in the communication session. The process for changing packets can include: having the second communication endpoint send the same packets in the communication session at least twice; having the second communication endpoint use a different packet priority value for the communication session; having the second communication endpoint switch from a connection oriented protocol to a connectionless protocol for the communication session; and having the second communication endpoint switch from the connectionless protocol to the connection oriented protocol for the communication session.

In one embodiment, determining the network condition can include sending one or more test packets between the communication endpoints to discover problems in the network, such as network congestion, hardware failures, configuration problems in the network, and the like.

DETAILED DESCRIPTION

Figure 1:
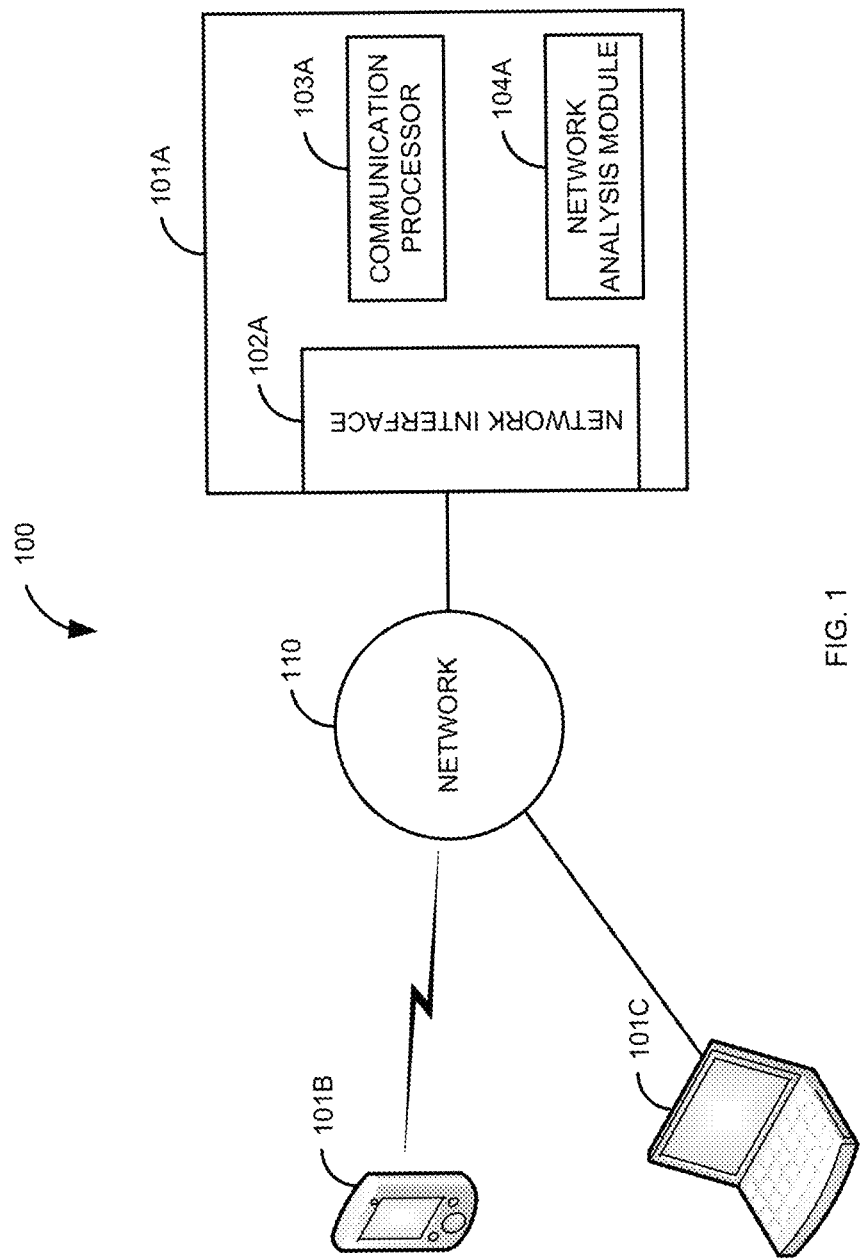
FIG. 1 is a block diagram of a first illustrative system for determining a network condition by a communication endpoint.

FIG. 1 is a block diagram of a first illustrative system 100 for determining a network condition by a communication endpoint 101. The first illustrative system 100 comprises communication endpoints 101A-101C, and a network 110.

The communication endpoints 101A-101C may be any device that can establish a communication session across the network 110, such as a Personal Computer (PC), a telephone, a video system, a cellular telephone, a Personal Digital Assistant (PDA), a tablet device, a notebook device, and the like. Although FIG. 1 shows three communication endpoints 101A-101C connected to the network 110, any number of communication endpoints 101 may be connected to the network 110.

The communication endpoint 101A further comprises a network interface 102A, a communication processor 103A, and a network analysis module 104A. The network interface 102A can be any network interface that can send and receive packets, such as an Ethernet interface, an Integrated Digital Services Network (ISDN) interface, a 802.11 interface, a Digital Subscriber Line (DSL) interface, a fiber optic interface, a cellular interface, a wireless interface, a wired interface, and/or the like. The network interface 102A can communicate using one or more packet protocols, such as Session Initiation Protocol (SIP), Web Real-Time Communication (WebRTC), H.323, H.261, H.263, H.264, ISO/IEC 14496-10MPEG-4 AVC, Internet Protocol (IP), User Datagram Protocol (UDP), Transmission Communication Protocol (TCP), 802.11, and/or the like.

The communication processor 103A can be any hardware/software that can handle communications on the network 110, such as a Digital Signaling Processor (DSP), a microprocessor, a micro controller, an application specific processor, a call processing software, and/or the like. The network analysis module 104A can be any hardware/software that can analyze information to determine a condition in the network 110.

In FIG. 1, the communication endpoints 101B-101C are not shown to comprise elements 102-104. However, the communication endpoints 101B-101C can comprise similar elements as the communication endpoint 101A. For example, communication endpoint 101B may comprise a network interface 102B, a communication processor 103B, and a network analysis module 104B.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, and/or the like.

The communication processor 103A establishes a communication session between the communication endpoint 101A and the communication endpoint 101B. A communication session can be any type of communication session, such as a voice communication session, a video communication session, a data communication session, an Instant Messaging communication session, a text messaging communication session, and/or the like. The communication session can be a communication session between more than two communication endpoints, such as an audio or video conference. The communication session can be a point-to-point communication session. The communication session can be a communication session using the Public Switched Telephone Network (PSTN). Establishment of the communication session can be, for example, based on receiving an incoming call/message (e.g., upon receiving a SIP INVITE) or sending an outgoing call/message (e.g., sending a SIP INVITE).

The network analysis module 104A determines a network condition. Determining a network condition can be based on a variety of factors, such as a receiving a higher or lower amount of jitter on received packets, receiving a higher or lower number of packets that are out of order, an amount of packet loss, a different rout of packets, a different hop count, a new communication endpoint being added to the communication session, a specific communication endpoint 101 being added to the communication session, a new application being added to the communication session (e.g., a Back-to-Back User Agent (B2BUA)) and/or the like.

The network analysis module 104A can determine the network condition based on receiving test packets from the communication endpoint 101B. In a conference call (e.g., a conference call between communication endpoints 101A-101C), the network analysis module 104A can receive test packets from both of the communication endpoints 101B and 101C. The network analysis module 104A can determine the network condition based on receiving a message from a device in the network, such as a switch, a router, a sniffer, a network management system, and/or the like. Alternatively, the network analysis module 104A can determine the network condition based on packets received during the communication session.

Based on a determined network condition, the network interface 102A sends a message to the communication endpoint 101B that requests the communication endpoint 101B to change a process for sending packets. The changed process for sending packets can include, but is not limited to: having the communication endpoint 101B send the same packets in the communication session at least twice; having the communication endpoint 101B use a different packet priority value for the communication session; having the communication endpoint 101B switch from a connection oriented protocol (e.g., TCP) to a connectionless protocol (e.g., UDP) for the communication session; having the communication endpoint 101B switch from the connectionless protocol to the connection oriented protocol for the communication session; and having the communication endpoint 101B establish a second communication session using a different protocol orientation for the communication session.

A packet priority value is used to give priority to specific types of packets. For instance, routers in the network will typically give priority to time-sensitive data such as video and voice communications. If network congestion exists, lower priority packets will be dropped, wherein higher priority packets will not be dropped.

In addition combinations of the above processes can be used based on the determined condition. For example, sending packets at least twice can be implemented along with using a different packet priority value. In this embodiment, when the same packet is sent the first time, the packet would have one packet priority value (e.g., using a voice packet priority value). When the same packet is sent the second time, the packet could have a different priority value (e.g., using a video packet priority value).

To illustrate how the network analysis module 104A can determine a network condition, consider the following examples. Assume that the communication session is a SIP voice communication that initially uses IP/UDP. Packets in the communication session are sent using a Differentiated Services Code Point (DSCP) value (that is sent using the Type of Service field in the IP packet header) that indicates the communication session is a voice communication session. At the initiation of the voice communication session, the communication endpoint 101B sends four (or more) test packets to the communication endpoint 101A. In one embodiment, a stream of packets is sent using each packet priority value (e.g., 10 test packets using each packet priority value). Each of the four test packets has a different packet priority value. The first test packet has a packet priority value that indicates a voice packet priority value. The second test packet has a packet priority value that indicates a video packet priority value. The third test packet has a packet priority value that indicates a data packet priority value. The fourth test packet has a packet priority value that indicates a general packet priority value.

The communication endpoint 101A receives the second, third, and fourth test packets, but not the first test packet (or alternatively, the first packet arrives later than the other packets (i.e., jitter)). The network analysis module 104A determines the network condition based on the dropped packet that used the voice packet priority value. This could indicate network impairment with sending packets using the voice packet priority value (i.e., possibly sending more packets than the SLA allows). The process of sending test packets can be repeated periodically to better confirm this. Likewise, the communication endpoint 101A could send test packets to the communication endpoint 101B as well to see if this condition exists in the opposite direction.

Based on the packet loss and/or jitter, a message is sent to the communication endpoint 101B to have the communication endpoint 101B use a video packet priority value for the communication session (even though the communication session is a voice communication session). The communication endpoint 101A can also switch to use the video packet priority value for the communication session.

However, in another embodiment, the communication endpoint 102A may continue to send packets using the voice packet priority value. This can be based on a similar set of test packets that are sent from communication endpoint 101A to communication endpoint 101B where there was not a packet loss for packets using the voice packet priority value. The communication endpoint 101B could send a message to communication endpoint 101A to keep the same voice packet priority value. Alternatively, the communication endpoint 101A may continue to send packets using the voice packet priority value based on not receiving a message. In this embodiment, packets in one direction would be sent using the video packet priority value while packets in the other direction would be sent use the voice packet priority value.

In another embodiment, instead of changing the packet priority value, the network analysis module 104A may determine, based on the lost or delayed packet, that the communication session should use a connection oriented protocol. Which process for sending packets that the network analysis module 104A uses can be based on a user profile, default values, and/or based on administered parameters. The network analysis module 104A sends the message via the network interface 102A that requests the communication endpoint 101B to switch (establish a new call) using TCP/IP versus the UDP/IP that is currently being used. If at a later point in time, based on a new set of test packets that indicate that there is no longer a condition where packets are being dropped or delayed, the communication endpoint 101A may send a message to switch back to UDP/IP. Switching to a connection oriented protocol may also be contingent upon a short packet transit time. This is because a long packet transit time may take too long using connection oriented protocols.

In another embodiment, a communication session is established between the communication endpoint 101A and the communication endpoint 101B. The user of the communication endpoint 101A adds his supervisor (at communication endpoint 101C) to the communication session. Based on the supervisor being added to the communication session (the new network condition), the communication endpoint 101A sends a message to the communication endpoint 101C to send the same packets twice (or more if necessary). Communication endpoint 101A can also start sending the packets twice to communication endpoint 101B.

In another embodiment, the communication session between communication endpoint 101B and communication endpoint 101A may continue to only send the same packets once between each other. For example, this could be based on the network impairment only being between the communication endpoint 101C and the communication endpoint 101A. Alternatively, communication endpoint 101A could also send the message to communication endpoint 101B to start sending the same packets twice and start sending the same packets twice to communication endpoint 101B, thus all the communication endpoints 101A-101C would be sending the same packets twice.

If instead of the supervisor being added in the above example, a different user was added, in this instance, the communication endpoint 101A would not send the message to start sending the same packets twice. In other words, based on a specific communication endpoint 101 being added, causes message to be sent.

The process can work in a similar manner when applications, such as a B2BUA are added in the network 110 to the communication session. The communication endpoint 101A can receive a message (via an element in the network 110) indicating that the B2BUA has been added to the communication session. For example, if a recording application was added to the communication session, the process for sending packets can be changed by the communication endpoint 101A sending a message to the communication endpoint 101B.

In another embodiment, based on the impairment, the message may be to have the communication endpoint 101B establish a second communication session using a different protocol orientation for the communication session. For example, if the communication session between the communication endpoint 101A and the communication endpoint 101B is a UDP/IP communication session, the message can be for communication endpoint 101B to establish an additional communication session using TCP/IP for the same communication session.

Figure 2:
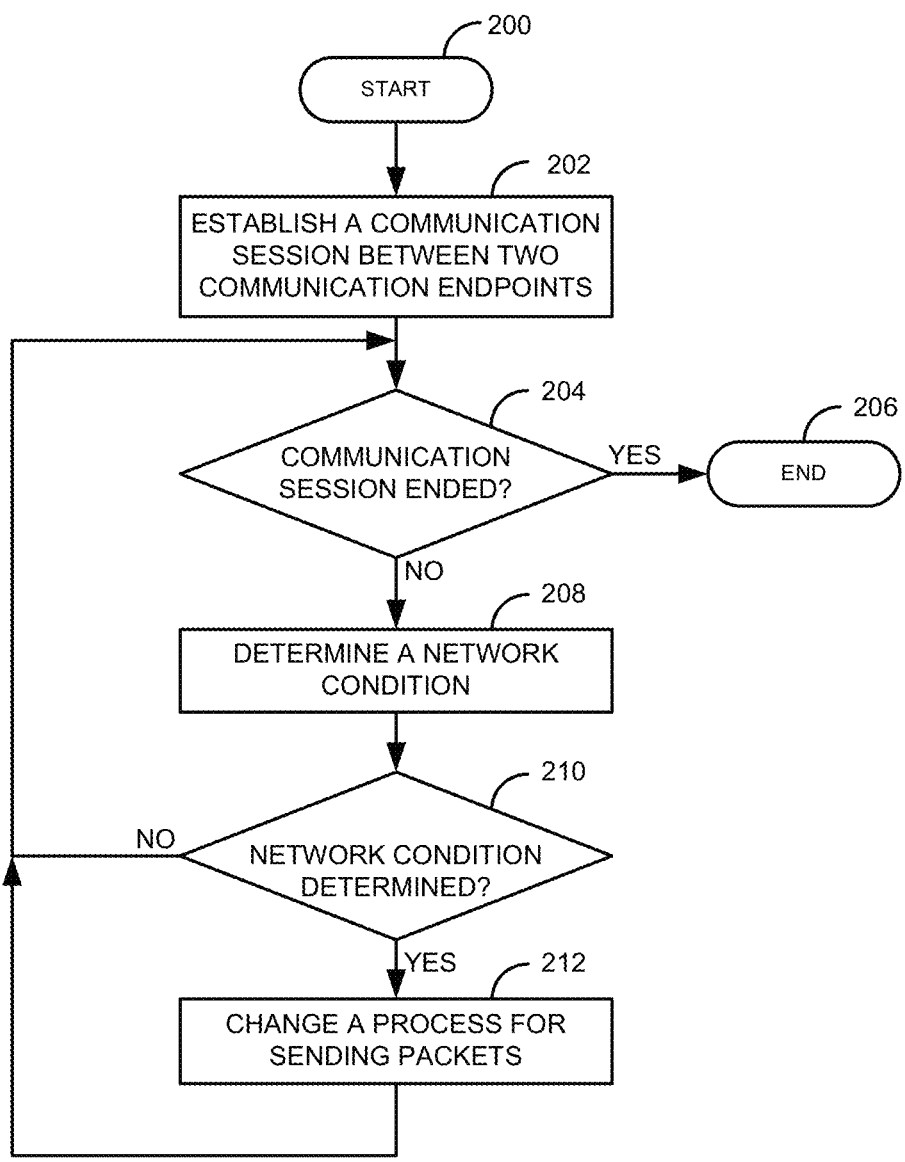
FIG. 2 is a flow diagram of a method for determining a network condition by a communication endpoint.
Figure 3:
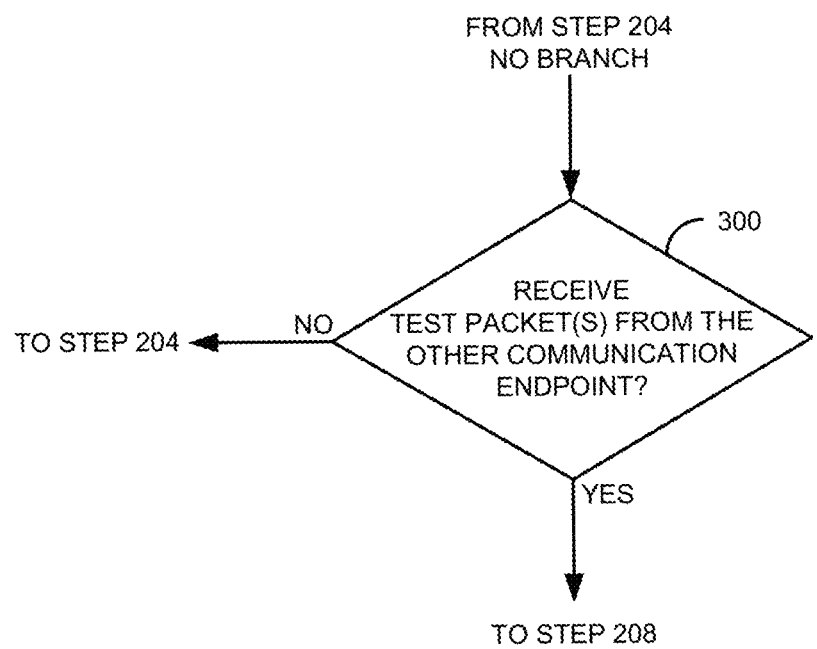
FIG. 3 is a flow diagram of a method for determining a network condition based on test packets.
Figure 4:
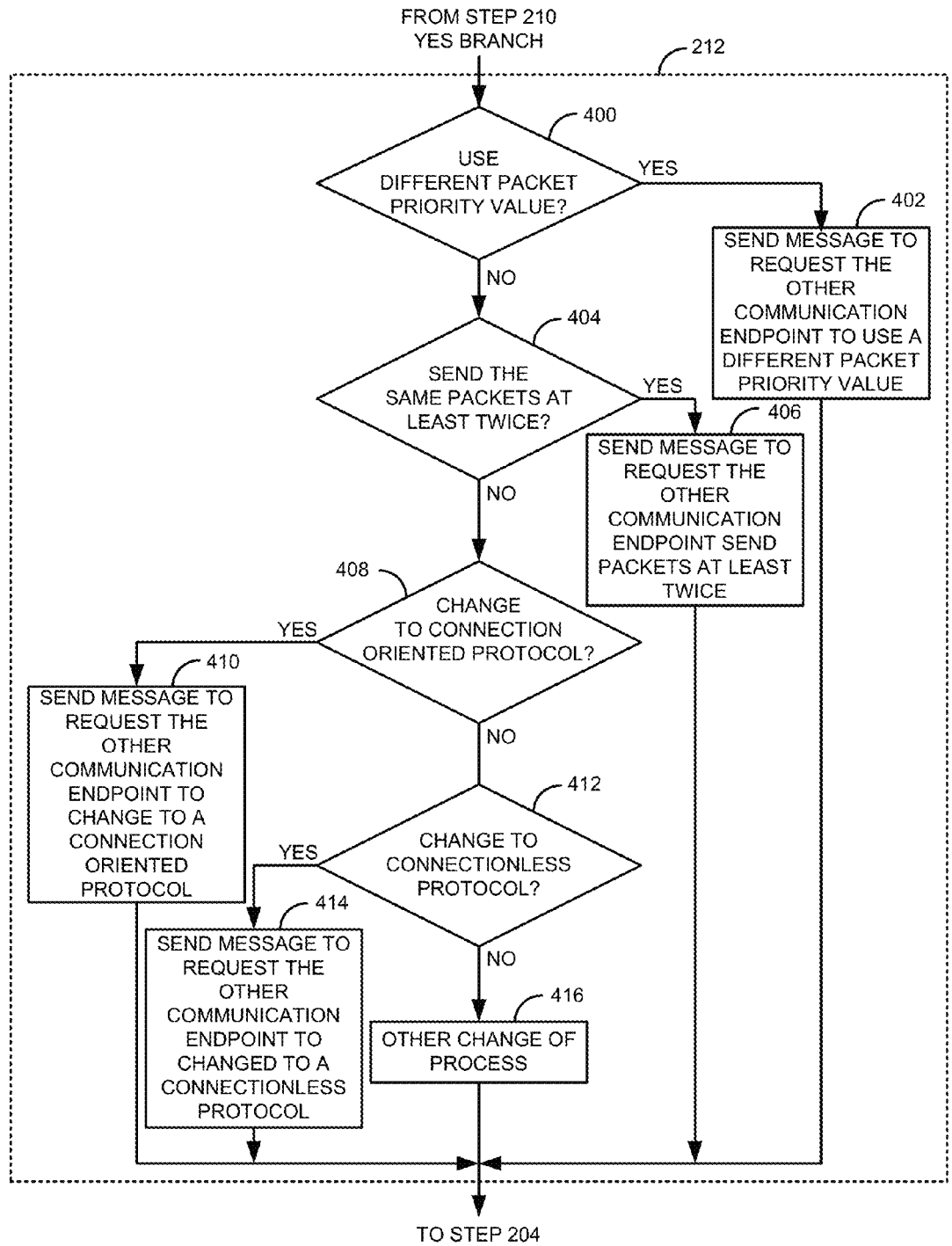
FIG. 4 is a flow diagram of a method for changing a process for sending packets.

FIG. 2 is a flow diagram of a method for determining a network condition by a communication endpoint. Illustratively, the communication endpoints 101, the network interface 102, the communication processor 103, and the network analysis module 104 are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process establishes 202 a communication session between two communication endpoints. The process determines in step 204 if the communication session has ended. For example, if one of the parties has hung up a telephone. If the communication session has ended in step 204, the process ends in step 206. Otherwise, if the communication has not ended in step 204, the process determines 208 if there is a network condition. If a network condition was not determined in step 210, the process goes to step 204. Otherwise, if a network condition was determined in step 210, the process changes 212 a process for sending packets. The process then goes to step 204.

FIG. 3 is a flow diagram of a method for determining a network condition based on test packets. The process in FIG. 3 is an embodiment that is one of many ways of determining a network condition. The process of FIG. 3 may be inserted between step 204 and step 208 of FIG. 2. After determining that the communication session has not ended in step 204, the process determines in step 300 if the communication endpoint has received one or more test packets from the other communication endpoint. If no test packets have been received from the other communication endpoint, the process goes to step 204. Otherwise, if the process determines in step 300 that test packets have been received, the process goes to step 208.

Based on the information in the test packets, the process determines in step 208 the network condition. For example, if over a period of time during the communication session, where groups of test packets are sent periodically, the process can determine that a type of impairment may exist in the network, such as network congestion, a hardware failure/degradation, and/or a network configuration problem.

For example, if the communication session is an Instant Messaging communication and all the test packets start having a longer delay or start experiencing a higher packet drop rate, the process could send a message to switch to a connection oriented protocol.

Alternatively, if the test packets indicate that using a data packet priority value verses using a voice or video packet priority value would likely provide better communication, the process can send a message to change the voice or video communication to use the data packet priority value along with sending the same packets twice. The process could at a later point in time, based on the sending of additional test packets, send a message that indicates to switch back to the voice or video packet priority value from the data packet priority value.

FIG. 4 is a flow diagram of a method for changing a process for sending packets. The process in FIG. 4 is an exemplary embodiment of step 212 in FIG. 2. After the process determines the network condition in step 210, the process determines in step 400 whether to use a different packet priority value. If the process determines in step 400 to use a different packet priority value, the process sends 402 a message request to the other communication endpoint to use a different packet priority value. The process then goes to step 204.

If the process determines in step 400 not to use a different packet priority value, the process determines in step 404 whether to send the same packets in the communication session at least twice. If the process determines in step 404 to send the same packets in the communication session at least twice, the process sends 406 a message to request the other communication endpoint send the same packets in the communication session at least twice. The process then goes to step 204.

If the process determines in step 404 not to send the same packets at least twice, the process determines in step 408 whether to change to a connection oriented protocol (e.g., TCP). If the process determines in step 408 to change to the connection oriented protocol, the process sends 410 a message to request the other communication endpoint to change to a connection oriented protocol. The process then goes to step 204. The message to request the other communication endpoint to change to the connection oriented protocol can be a message that indicates that the communication device that sent the message will change to the connection oriented protocol.

If the process determines in step 408 not to change to a connection oriented protocol, the process determines in step 412 whether to change to a connectionless protocol (e.g., UDP). If the process determines in step 412 to switch to a connectionless protocol, the process sends 414 a message to request the other communication endpoint to change to the connectionless protocol. The process then goes to step 204. The message to request the other communication endpoint to change to the connectionless protocol can be a message that indicates that the communication device that sent the message will change to the connectionless protocol.

Otherwise, if the process determines in step 412 not to change to a connectionless protocol, the process uses another method of changing the process in step 416. The process then goes to step 204. The other method of changing the process can be to have the other communication endpoint establish or prepare for establishment of a second communication session using a different protocol orientation for the communication session.

Although the above process indicates that only one message is sent indicating a single type of process change, one of skill in the art would recognize that various combinations of the steps in FIG. 4 could be implemented in parallel. This can result in multiple messages or a single message being sent to change the process using more than one type of process change. For example, a single message could be sent to switch to a connectionless protocol and changing a packet priority value.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    establishing, by a processor, a voice communication session between a first communication endpoint and a second communication endpoint;
    determining, by the processor, in the first communication endpoint, a network condition, wherein the determined network condition is based on a dropped or delayed test packet sent from the second communication endpoint that uses a same packet priority value as the voice communication session, wherein the first and second communication endpoints have user interfaces and are used by users to engage in the voice communication session; and
    in response to determining the network condition in the first communication endpoint, sending, by the processor, a message to the second communication endpoint that requests the second communication endpoint to change a process for sending packets in the voice communication session, wherein changing the process for sending packets comprises:
    having the second communication endpoint use a different packet priority value for the voice communication session, wherein the different packet priority value is a Differentiated Services Code Point (DSCP) value in an Internet Protocol (IP) packet, wherein an initial packet priority value of the voice communication session designates a voice communication session, and wherein the different packet priority value designates a video communication session while the voice communication session remains a voice communication session.

2. The method of claim 1, wherein determining the network condition in the first communication endpoint further comprises receiving at least some of a number of test packets sent from the second communication endpoint during the voice communication session, wherein the sent number of test packets comprises a plurality of packet priority values and wherein determining the network condition is based on at least some of the received number of test packets and the sent number of test packets.

3. The method of claim 2, wherein the sent number of test packets further comprise at least four test packets, each with a different packet priority value and wherein the at least four test packets each comprise a separate one of: a voice packet priority value, a video packet priority value, a data packet priority value, and a general packet priority value.

4. The method of claim 2, wherein the first communication endpoint sends test packets to the second communication endpoint.

5. The method of claim 1, wherein the message further comprises requesting the second communication endpoint to send the same packets in the voice communication session at least twice.

6. The method of claim 5, wherein the message further comprises a request to send the same packets at least twice with at least two different packet priority values.

7. The method of claim 1, wherein the message further comprises requesting the second communication endpoint to switch from a connectionless protocol to a connection oriented protocol for the voice communication session based on a dropped or delayed test packet sent from the second communication endpoint.

8. The method of claim 1, wherein the message further comprises requesting the second communication endpoint to switch from a connection oriented protocol to a connectionless protocol for the voice communication session based on not dropping or not finding a delay in a test packet sent from the second communication endpoint.

9. The method of claim 1, wherein the message further comprises requesting the second communication endpoint to establish a second voice communication session using a different protocol orientation for the voice communication session.

10. The method of claim 1, wherein the voice communication session further comprises a voice conference call with a third communication endpoint, wherein the determined network condition based on the dropped or delayed test packet is based on the third communication endpoint being added to the voice communication session.

11. The method of claim 10, wherein the dropped or delayed test packet is from the third communication endpoint.

12. The method of claim 1, wherein the determined network condition based on the dropped or delayed test packet is based on a new application being added to the voice communication session.

13. The method of claim 1, wherein the first communication endpoint sends packets in the voice communication session using the packet priority of the voice communication session while receiving packets in the voice communication session that designate the video communication session from the second communication endpoint.

14. A first communication endpoint comprising:
a microprocessor; and
a computer readable medium, coupled with the microprocessor and comprising microprocessor readable and executable instructions that cause the microprocessor to execute:
  a communication processor that establishes a voice communication session between the first communication endpoint and a second communication endpoint, wherein the first and second communication endpoints are used by users to engage in the voice communication session;
  a network analysis module that determines a network condition, wherein the determined network condition is based on a dropped or delayed test packet sent from the second communication endpoint that uses a same packet priority value as the voice communication session; and
  a network interface that sends, to the second communication endpoint, a message that requests the second communication endpoint to change a process for sending packets in the voice communication session in response to determining the network condition in the first communication endpoint, wherein changing the process for sending packets comprises:
    having the second communication endpoint use a different packet priority value for the voice communication session, wherein the different packet priority value is a Differentiated Services Code Point (DSCP) value in an Internet Protocol (IP) packet, wherein an initial packet priority value of the voice communication session designates a voice communication session, and wherein the different packet priority value designates a video communication session while the voice communication session remains a voice communication session.

15. The first communication endpoint of claim 14, wherein the network analysis module that determines the network condition by receiving at least some of a number of test packets sent from the second communication endpoint during the voice communication session, wherein the sent number of test packets comprises a plurality of packet priority values and wherein determining the network condition is based on at least some of the received number of test packets and the sent number of test packets.

16. The first communication endpoint of claim 14, wherein the message further comprises requesting the second communication endpoint to send the same packets in the voice communication session at least twice.

17. The first communication endpoint of claim 14, wherein the message further comprises requesting the second communication endpoint to switch from a connectionless protocol to a connection oriented protocol for the voice communication session based on a dropped or delayed test packet sent from the second communication endpoint.

18. The first communication endpoint of claim 14, wherein the message further comprises requesting the second communication endpoint to switch from a connection oriented protocol to a connectionless protocol for the voice communication session based on not dropping or not finding a delay in a test packet sent from the second communication endpoint.

19. The method of claim 14, wherein the message further comprises requesting the second communication endpoint to establish a second voice communication session using a different protocol orientation for the communication session.

* * * * *